June 27, 1933. W. M. CLARK 1,915,403
SELF STARTING CREAM REMOVER
Filed May 18, 1932
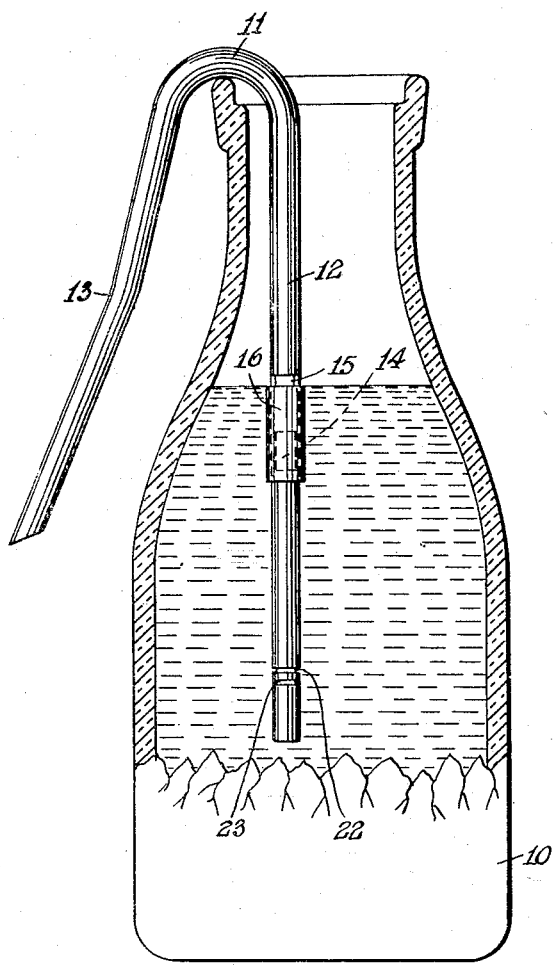
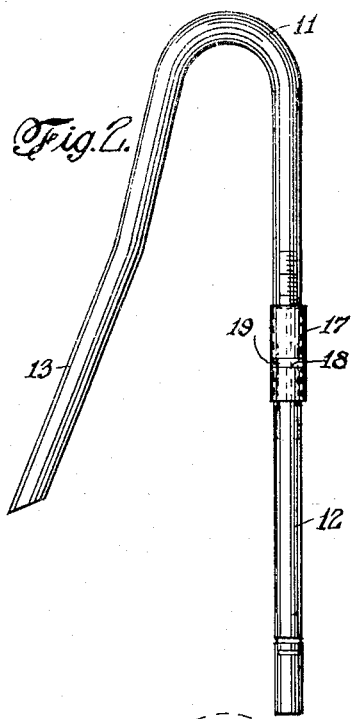
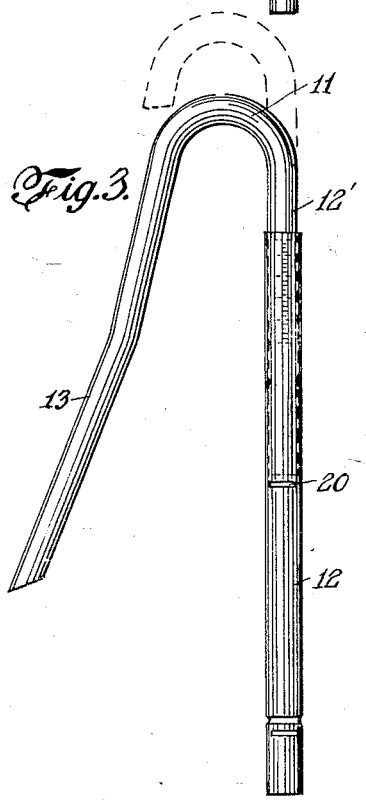
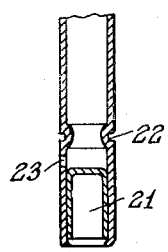
INVENTOR
WILL M. CLARK
BY
ATTORNEY Patented June 27, 1933

1,915,403

UNITED STATES PATENT OFFICE

WILL M. CLARK, OF SOUTH ORANGE, NEW JERSEY

SELF-STARTING CREAM REMOVER

Application filed May 18, 1932. Serial No. 611,988.

The invention relates to siphoning devices of the automatic or self-starting type adapted for the removal of a predetermined portion of liquid from a container, as in removing the cream from a bottle of milk; or, in withdrawing definite volumes of milk for the preparation of baby-feeding formulas.

It has for an object the provision of a simple, inexpensive and effective device which may readily be cleaned to keep said device sweet and sanitary, the arrangement being such that the novel siphon is self-draining upon removal of the same from a container.

A further object of the invention resides in the provision of an open-ended siphon device through which a stream of cleansing water may be directed from an intermediate point to pass out of both of its ends.

In carrying out the invention, an open-ended tubular member is bent over intermediate its length to provide an intake portion adapted to be submerged in the liquid of a container, and a delivery portion extending externally of the container and through which a predetermined volume of the liquid may be delivered, the intake portion to this end being provided with an orifice, preferably adjustable, for inflow of the liquid. Devices of this general nature have been proposed heretofore, but the end of the intake portion thereof was sealed by a removable stopper or closure member which was provided with a small passageway into the intake portion. The use of such removable plugs or stoppers is objectionable as the same frequently become misplaced or lost and may become damaged to such an extent as to no longer properly fit the end of the tube. Furthermore, by providing a permanent opening therethrough to facilitate the action of escaping air in and from the intake portion, milk will eventually also be caused to flow therein and be delivered with the cream of which a separation therefrom is desired.

By the novel arrangement herein disclosed, the feature of a substantially open-ended tube is retained, but provision is made for sealing the intake portion during operation of the device substantially at its lower end, as by introducing a float or valve member therein and adapted for engagement with a seat provided by the tube at its lower portion. An aperture is provided below this seat and is open when the siphon is not in use to afford free communication through the intake portion. The float or valve member, moreover, is permanently retained within the tube, for example, by turning over the edge of the intake end of the tube, and the float is of such dimensions as to clear the said aperture when the siphon is not in use.

The nature of the invention, however, will best be understood when described in connection with the accompanying drawing, in which:

Fig. 1 is a front elevation and part vertical section of a container such as a milk bottle, and illustrate the siphon device applied thereto for the removal of cream from the upper portion of the bottle.

Figs. 2 and 3 are elevations illustrating modifications in the siphon device.

Fig. 4 is a fragmentary enlarged vertical section of the lower end of the intake member.

Referring to the drawing, 10 designates a suitable container such as the usual milk bottle and from the upper portion of which it is desired to remove the separated cream or a predetermined volume of liquid. This is effected by the novel device by inserting it into the mouth of the bottle, in manner hereinafter set forth, with its intermediate bent-over portion 11 resting upon the rim of the mouth for support of said device.

The novel device comprises essentially a tubular member which is open at its opposite ends, and is bent over at the portion 11 intermediate said ends with the one leg 12 constituting the intake member of greater length than the other leg 13 or delivery portion of the tube.

One or more orifices 14 and 15 is provided along substantially the middle of the intake portion for inflow of liquid, the particular location of said orifices being in accordance with the usual cream level in different standard sizes of bottles such as pints and quarts.

For selecting a level and for closer regulation, a slidable sleeve member 16 may be frictionally fitted over the intake portion of the tube to cover one or the other of the orifices.

Or, referring to Fig. 2, a split sleeve 17 having a transverse slit 18 may be caused to slide over an elongated orifice 19 of the intake member 12.

In Fig. 3, the leg 12 is shown as constructed with its upper portion 12′ telescoping therein to change the distance of the orifice 20 in the former from the intermediate bent-over portion 11, as indicated by the dotted line position, and affording a greater range of adjustment.

At its lower end, the intake portion of the tube is provided with a sealing member as an inverted cup or float constituting a valve piece 21 which is designed to move freely within the end portion, the edge of which end is turned slightly inwardly, for example, to retain the float within the tube. Provision is also made for limiting its upward movement, for example, by rolling inwardly the wall of the tube and to provide as well an annular seat member 22 at the desired height and against which the float is adapted to seat when the siphon device is in use.

Immediately below this seat is provided an aperture 23 which is located sufficiently above the open end of the intake portion so that the float will clear said aperture when the device is not in use. This makes it possible to introduce cleaning water at an inflow orifice and by holding the siphon more or less in a horizontal plane, water will be discharged not only through the outlet of the delivery portion, but also through the intake portion, particularly through its aperture 23 and to a limited extent through its outlet end. This effects a ready cleansing of the device so that the same will remain sweet and sanitary for further use.

In applying the novel device for the removal of cream from the bottle 10, it is necessary merely to drop the same gently into the bottle which is filled substantially to the top, the upper portion of the bottle retaining the cream, and allow the bent-over portion 11 to rest upon the rim of the mouth of the bottle. The float will, after the initial inrush of milk and due to the buoyancy of the entrapped air, be carried upwardly to seal the intake tube substantially at its outlet end through engagement of the float 21 with seat 22. The cream flows at the same time into said intake tube through an inlet orifice 14 or 15, or 19 or 20, and is discharged from the outlet end of tube delivery portion 13 until the cream level within the bottle reaches the tube orifice level.

I claim:

1. A self-starting siphon device comprising an open-ended tube bent over intermediate its ends to afford an intake portion and a delivery portion, the former providing an elongated normally open air chamber adapted to be submerged in the liquid and having an orifice in its upper portion for free inflow of liquid, and a valve member movable within the lower end of the intake portion to seal the remainder of the intake portion against inflow of liquid through its lower end, said intake portion having an aperture at the lower end for free passage of liquid through the intake portion when the latter is withdrawn from the liquid.

2. A self-starting siphon device comprising an open-ended tube bent over intermediate its ends to afford an intake portion and a delivery portion, the former providing an elongated normally open air chamber adapted to be submerged in the liquid and having an orifice in its upper portion for free inflow of liquid, an annular seat provided along the inner wall of the intake portion near its lower end, and a float movable within the intake portion below said seat and retained permanently within the said intake portion, the intake portion being provided with an aperture located below the said seat.

3. A self-starting siphon device comprising an open-ended tube bent over intermediate its ends to afford an intake portion and a delivery portion, the former providing an elongated normally open air chamber adapted to be submerged in the liquid and having an orifice in its upper portion for free inflow of liquid, an annular seat rolled inwardly into the intake portion, the intake portion having an aperture below said seat, and a float member movable within the intake portion between said seat and the outlet end of the intake portion, the latter being turned inwardly to retain said float permanently within the intake portion and the float being of such dimensions that when the same rests upon the inturned edge it will clear the said aperture.

4. A self-starting siphon device comprising an open-ended tube bent over intermediate its ends to afford an intake portion and a delivery portion, the former providing an elongated normally open air chamber adapted to be submerged in the liquid and having an orifice in its upper portion for free inflow of liquid, means to adjust the effective position of the orifice, and a valve member movable within the lower end of the intake portion to seal the remainder of the intake portion against inflow of liquid through its lower end, said intake portion having an aperture at the lower end for free passage of liquid through the intake portion when the latter is withdrawn from the liquid.

5. A self-starting siphon device comprising an open-ended tube bent over intermediate its ends to afford an intake portion and a delivery portion, the former providing an elongated normally open air chamber adapted to be submerged in the liquid and having an orifice in its upper portion for free inflow of liquid, an annular seat provided along the inner wall of the intake portion near its lower end, and an inverted cup movable within the intake portion below said seat and retained permanently within the said intake portion, the intake portion being provided with an aperture located below the said seat.

In testimony whereof I affix my signature.

WILL M. CLARK.